United States Patent
Bae et al.

(10) Patent No.: US 7,639,253 B2
(45) Date of Patent: Dec. 29, 2009

(54) SYSTEM AND METHOD FOR AUTOMATIC 3D SCAN DATA ALIGNMENT

(75) Inventors: Seockhoon Bae, Cupertino, CA (US); Donghoon Lee, Seoul (KR); Seungyob Kim, Seoul (KR); Sungwook Cho, Bucheon (KR)

(73) Assignee: INUS Technology, Inc., Seoul (KR)

( * ) Notice: Subject to any disclaimer, the term of this patent is extended or adjusted under 35 U.S.C. 154(b) by 400 days.

(21) Appl. No.: 11/486,554

(22) Filed: Jul. 13, 2006

(65) Prior Publication Data

US 2008/0012851 A1 Jan. 17, 2008

(51) Int. Cl.
*G06T 15/10* (2006.01)
*G06T 15/20* (2006.01)

(52) U.S. Cl. .................. 345/427; 345/419; 345/420

(58) Field of Classification Search .............. None
See application file for complete search history.

(56) References Cited

U.S. PATENT DOCUMENTS

| | | | |
|---|---|---|---|
| 5,303,337 A * | 4/1994 | Ishida | 345/419 |
| 6,249,600 B1 * | 6/2001 | Reed et al. | 382/154 |
| 6,646,641 B1 * | 11/2003 | White et al. | 345/428 |
| 7,023,432 B2 * | 4/2006 | Fletcher et al. | 345/419 |
| 7,463,368 B2 * | 12/2008 | Morden et al. | 356/614 |
| 2002/0059042 A1 * | 5/2002 | Kacyra et al. | 702/152 |

FOREIGN PATENT DOCUMENTS

KR 1020020068289 8/2002

* cited by examiner

*Primary Examiner*—Ulka Chauhan
*Assistant Examiner*—Daniel F Hajnik
(74) *Attorney, Agent, or Firm*—Lahive & Cockfield, LLP; John S. Curran (57) ABSTRACT

An automated mechanism that identifies and defines a global coordinate system that is most appropriate for a collection of raw 3D scan data used to form a mesh model is discussed. More specifically, a coordinate system is identified that is able to minimize the total sum of deviation error while also minimizing the peak error for raw 3D scan data. The present invention searches for appropriate coordinate systems from raw 3D scan data in a fully automated way. Multiple coordinate systems in order of likelihood of leading to minimal global deviation error are identified and presented to a user. End users are also allowed to edit suggested coordinate system parameters interactively prior to the alignment of the 3D scan data being transformed based on a selected coordinate system.

14 Claims, 14 Drawing Sheets

SYSTEM AND METHOD FOR AUTOMATIC 3D SCAN DATA ALIGNMENT

FIELD OF THE INVENTION

The illustrative embodiment of the present invention relates generally to 3D scan data, and more particularly to a mechanism for automatically determining coordinate systems for 3D scan data.

BACKGROUND 3D scanning captures physical geometry information for a three-dimensional object by gathering high resolution points representing the shape of the scanned three-dimensional object. Once captured, the raw 3D scan data may be converted to a CAD part model for further processing to replicate or modify the design of the three-dimensional object. This procedure of capturing 3D scan data for a three-dimensional object in order to provide it to a CAD application so that the object may be redesigned is referred to as reverse engineering.

When points are measured using 3D scanners or digitizers, the base coordinate system from which coordinates of all measured points are referred is located and oriented in the measuring device. Manufacturers set the specification for the coordinate system and accordingly there is no accepted industry standard for the coordinate system, mainly because of the diversity of device configurations. In the case of CMMs (Coordinate Measuring Machines), the movement of the probe is rectilinear and end users know how to position and orient the part to be measured on the CMM table so that the measuring coordinate information is easily traceable. It is a common practice when using a CMM to set up coordinate system parameters before the actual measuring begins.

For 3D scanning, the method of capturing points is somewhat different from other types of measurement systems and presents additional challenges. 3D scanning devices are portable and accordingly the devices include the ability to change the measuring coordinate system during the scanning of an object. The object to be scanned is also often repositioned (e.g. turning the target object over to capture bottom geometry). In some applications, 3D scanning systems recognize target apparatus that are attached on the object to trace the repositioning and reorientation of the 3D scanner or the object. The result of the movement of the scanner and the object during the scanning process is a set of arbitrarily oriented 3D points or mesh data in 3D space. When end users need to design CAD models replicating 3D scan data, figuring out an appropriate coordinate system as a global coordinate reference throughout the modeling is the first and foremost step. It is not a simple process to define such a global coordinate system by manually searching for geometrical clues in 3D scan data (because of the variables in the process discussed above). The definition of a global coordinate system requires iterative trial and error that is both time-consuming and error-prone.

One important metric by which to judge the appropriateness of a defined global coordinate system is the amount of global deviation error to which the system can lead. Global deviation error is the distance disparity between raw 3D scan data and a remodeled CAD model. Once a global coordinate reference frame is set up, modeling features such as extrusions, revolving, loftings, or sweepings will usually refer to the global coordinate system. Slightly different global coordinate systems can bring forth significant deviation error difference. Conventional techniques allow end users to control modeling parameters in order to minimize the deviation error feature by feature. However, to minimize the total sum of deviation error while also minimizing the peak error is quite challenging. The coordinate system is used to create CAD features (such as extrusions using a coordinate system axis) which are compared to the scan data to determine deviation. The peak deviation refers to the maximum deviation point or region of the mesh, whereas the average deviation is an ensemble average of all points or regions of the mesh. It would be desirable to have an automated mechanism to define a global coordinate system that is able to minimize the total sum of deviation error while also minimizing the peak error for raw 3D scan data.

BRIEF SUMMARY

The illustrative embodiment of the present invention provides an automated mechanism that identifies and defines a global coordinate system that is most appropriate for a collection of raw 3D scan data used to form a mesh model. More specifically, a coordinate system is identified that is able to minimize the total sum of deviation error while also minimizing the peak error for raw 3D scan data. The present invention searches for appropriate coordinate systems from raw 3D scan data in a fully automated way. Multiple coordinate systems in order of likelihood of leading to minimal global deviation error are identified and presented to a user. End users are also allowed to edit suggested coordinate system parameters interactively prior to the alignment of the 3D scan data being transformed based on a selected coordinate system.

In one aspect of the present invention a method for automatically determining coordinate systems for 3D scan data includes the step of providing a collection of 3D scan data. The 3D scan data is used to generate a mesh model representing the surface of a three dimensional object. The method also determines programmatically multiple coordinate systems for the 3D scan data. Additionally, the method generates a ranked list of the determined coordinate systems.

In another aspect of the present invention a system for automatically determining coordinate systems for 3D scan data includes a collection of 3D scan data. The 3D scan data is used to generate a mesh model representing the surface of a three dimensional object. The system also includes a coordinate determination facility for determining programmatically multiple coordinate systems for the 3D scan data. The coordinate determination facility generates a ranked list of the determined coordinate systems. Additionally the system includes a graphical user interface generated by the global determination facility. The graphical user interface enables the selection of a coordinate system in the ranked list by a user.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The increased use of 3D scan data during CAD design has increased the importance of finding reliable coordinate systems with which to align the 3D scan data. The present invention addresses this need by programmatically determining possible coordinate systems for the 3D scan data, ranking the determined systems based on the likelihood that the coordinate system will lead to the least deviation error, and presenting the ranked coordinate systems to the user for review and selection. The ranked systems are presented to a user via a graphical user interface that allows the user to customize the selected coordinate system before applying the coordinate system to the 3D scan data.

Figure 1:
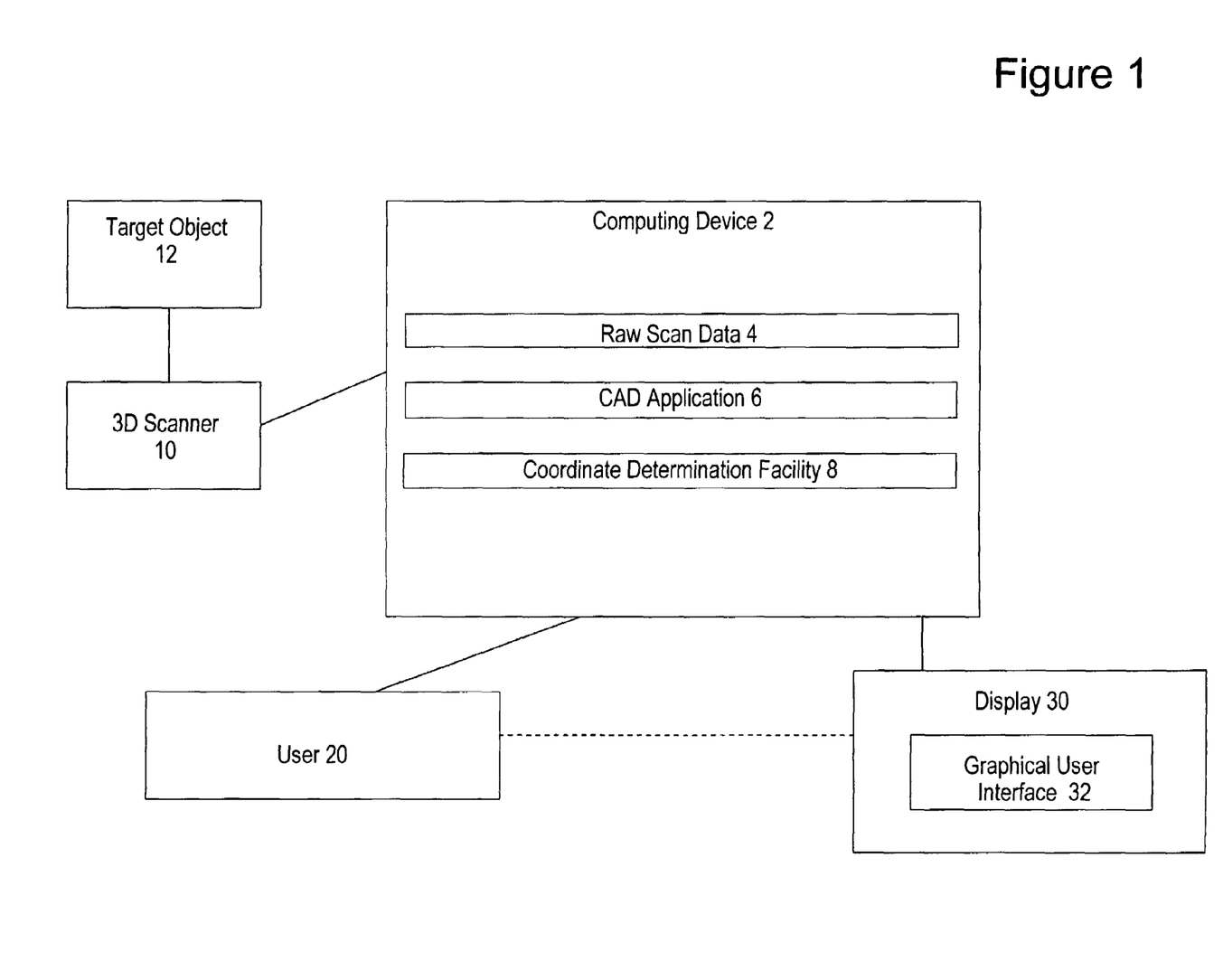
FIG. 1 depicts an environment suitable for practicing the illustrative embodiment of the present invention.

FIG. 1 depicts an environment suitable for practicing the illustrative embodiment of the present invention. A computing device 2 hosts a collection of scan data 4, a CAD application 6 suitable for designing CAD models and the coordinate determination facility 8 of the present invention. The computing device 2 may be a workstation, server, laptop, mainframe, PDA or other computing device equipped with a processor and able to support the execution of the CAD application 6 and coordinate determination facility 8. The collection of scan data 4 may be imported from a previously stored collection of scan data or may be acquired immediately prior to the determination of a coordinate system for the scan data that is performed by the coordinate determination facility 8. For example, the scan data 4 may be acquired from a target object 12 by a 3D scanner 10 that is connected to, or communicating with, the computing device 2. The scan data 4 is a collection of high resolution points in three dimensions representing the shape of a scanned object. In one implementation, the scan data 4 is a set of triangular meshes but the use of other forms of scan data is also considered to be within the scope of the present invention. For example, the scan data 4 may be points, quad meshes, tetrahedral meshes or hexahedral meshes. Collectively the set of meshes form a mesh model representing the surface of the scanned object.

The coordinate determination facility 8 is implemented in software and programmatically determines possible coordinate systems for the scan data 4. The coordinate determination facility 8 may be a stand-alone application, plug-in for the CAD application 6 or another application, or the coordinate determination facility 8 may be some other type of executable process. The coordinate determination facility 8 also generates a ranked list of the determined coordinate systems that is presented to a user 20 via a graphical user interface 32 on a display 30.

Figure 2:
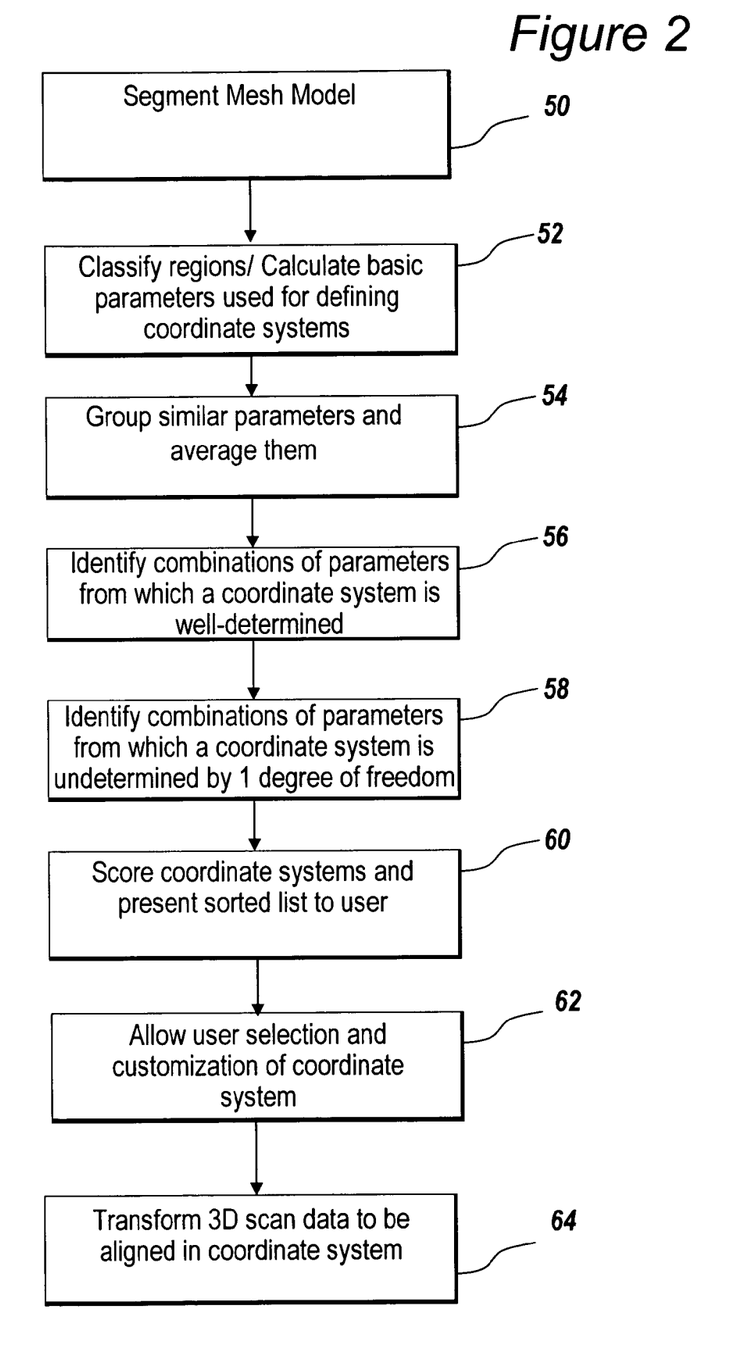
FIG. 2 is a flowchart depicting a sequence of steps followed by the illustrative embodiment of the present invention to determine a global coordinate system for a collection of 3D scan data.

As noted above, the coordinate determination facility 8 determines coordinate systems for the scan data 4 and ranks the systems for the user. FIG. 2 is a flowchart depicting a sequence of steps followed by the coordinate determination facility 8 to identify a preferred coordinate system for a collection of 3D scan data. The sequence begins with the segmenting of the mesh model (3D scan data) which is partitioned into multiple regions (step 50). The coordinate determination facility 8 then classifies the regions and calculates basic parameters used for defining coordinate systems (step 52). The classification of the regions and the calculation of the parameters is discussed further in FIG. 3 below. The coordinate determination facility 8 groups similar parameters and averages the parameters in the groups (step 54). The grouping and averaging of parameters is discussed in more detail with regard to FIG. 4 below. After similar parameters have been grouped and averaged, the coordinate determination facility 8 programmatically identifies combinations of parameters from which a coordinate system is well-determined (step 56) and combinations of parameters from which a coordinate system is undetermined by one degree of freedom (step 58)

A Cartesian coordinate is defined by a point in space (x0, y0, z0) and three orthogonal directions. A component of a point (i.e.: x0) can be implied by a plane with a normal in the x-direction. A point in space can also be implied by the intersection point of a vector and a plane, the intersection point of three non-parallel planes, and the intersection point of two coplanar, non-parallel lines. A component of a coordinate's direction is implied by a plane's normal or a vector. Additionally, given two orthogonal lines (i.e.: from vectors or plane's normals), a third orthogonal line is implied and three orthogonal directions are therefore implied. If there is enough information to create a single coordinate (i.e.: three orthogonal directions and two sets of points) then multiple coordinates (i.e.: two coordinates with center location at each of the two sets of points with common orthogonal directions) can be created.

If one or more elements are missing that would otherwise imply a well-determined coordinate system, the coordinate system is said to be undetermined by one or more degrees of freedom. An example is a point in space and a vector. With an additional second orthogonal direction a third orthogonal direction may be implied to result in a well-determined coordinate system.

For example, a well-determined system may include three orthogonal planes, two orthogonal planes with one line orthogonal to either of the planes where the line-plane intersection point is the origin, and two co-planar and orthogonal lines where the intersection point is the origin. Likewise, a coordinate system that is undetermined by one degree of freedom may be a coordinate system with two orthogonal planes where the origin is arbitrary selected. Alternatively, the undetermined system may have two orthogonal lines, not be co-planar and have the origin arbitrarily chosen as the midpoint between the two lines. Similarly, the undetermined coordinate system may have an orthogonal line and plane with one axis being arbitrarily chosen.

After the identification of the systems, the coordinate determination facility 8 then scores the identified coordinate systems and assembles them into a ranked list or other format that is presented to the end user 20 with the best scoring systems being the ones covering the largest area and having the lowest error distribution with the well-determined systems being ranked ahead of the undetermined coordinate systems (step 60). The ranked listing of the determined system is presented to the user 20 via a graphical user interface 32 that enables the user to select a desired system. The user is also able to customize the selected system (step 62). For example, the user may choose which plane will be X, Y and Z (or front, top and right) when the coordinate system is aligned to the origin. The user may also modify the origin point. After the user has selected, and optionally customized, one of the determined coordinate systems, the coordinate system is applied to the scan data 4 which re-aligns based on the selected coordinate system (step 64).

Figure 3:
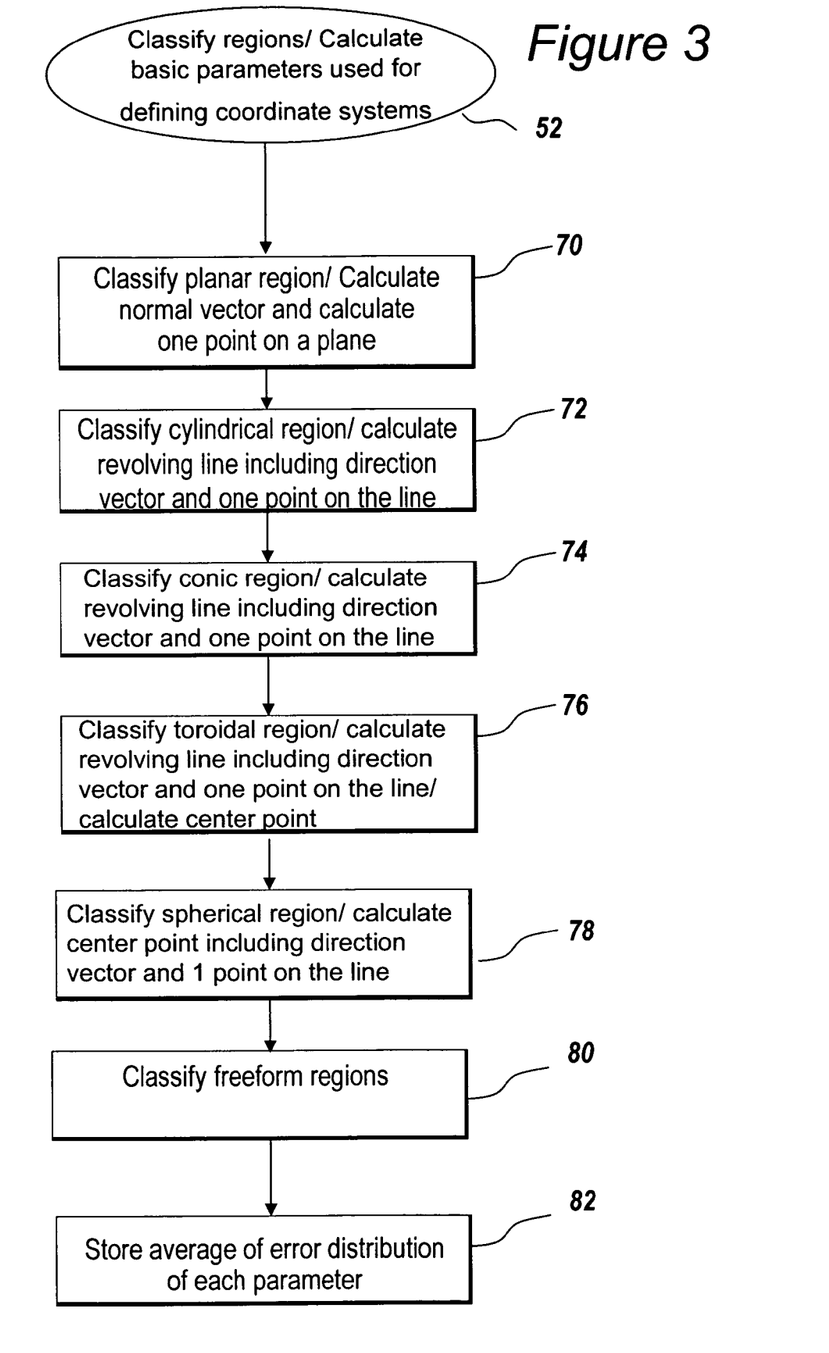
FIG. 3 is a flowchart depicting a sequence of steps followed by the illustrative embodiment of the present invention to classify regions in a mesh model and calculate parameters used for defining coordinate systems.

FIG. 3 discusses the classification of regions and calculation of the parameters used for defining coordinate systems that takes place following the segmentation of the mesh model. The segmentation of the mesh model may take place programmatically using known segmentation methods such as a curvature-based segmentation process, or the segmentation may take place in response to a regional selection and segmentation process. Following the segmentation of the mesh model, the coordinate determination facility 8 classifies a number of different types of regions including planar regions, cylindrical regions, conic regions, toroidal regions, spherical regions and freeform regions as well as revolution regions, and extrusion regions (which imply calculated vectors).

A planar region implies a normal direction and a component of a point in the normal direction. A planar region's implied plane can also additionally imply a complete point with all three components being at the center of the implied plane. A calculated vector from a region implies a direction and two components of a point in the two directions orthogonal to the vector's direction. A calculated vector from a region may also additionally imply a complete point with all three components at the starting or ending point of the implied vector. A cylindrical region has identical implications as a calculated vector from a region. Both a conic region and a toroidal region imply both a direction and a point. A spherical region implies only a point.

The classification and calculation process includes the classification of planar regions in the mesh model (step 70). For each of these planar regions, the coordinate determination facility 8 calculates parameters including a normal vector and one point on the plane. The coordinate determination facility 8 also classifies cylindrical regions and calculates revolving line parameters that include a direction vector and one point on the line for each region (step 72). Similarly, the coordinate determination facility 8 also classifies conic regions and calculates revolving line parameters that include a direction vector and one point on the line for each region (step 74). After classifying toroidal regions, the coordinate determination facility 8 calculates revolving line parameters that include a direction vector and one point on the line as well as a center point for each region (step 76). Likewise, after classifying spherical regions, the coordinate determination facility 8 calculates a center point including calculating a direction vector and a point on the line for each region (step 78). The coordinate determination facility 8 also classifies freeform regions (step 80). For freeform regions, the coordinate determination facility 8 may calculate parameters that include the calculation of an axis including the automatic calculation of a revolving axis and extrusion axis. It should be recognized that the other types of regions in addition to those specifically set forth above may be classified with appropriate calculations being performed for the regions within the scope of the present invention. Similarly, it should be appreciated that the order in which the regions are classified and the calculations are performed is not restricted to the sequence set forth in FIG. 3. Following the calculation of parameters for each region, the coordinate determination facility 8 calculates and stores the average of error distribution for each parameter (step 82). The error distribution may be determined as:

Error distribution=Distance (Point on the region, Searched Geometry)

While the average of the error distribution may be represented as:

Average of error distribution=Sum (error distribution)/ No of points or

Average of error distribution=normalized error statistic for reference geometries not derived from elementary best-fit geometries (plane, cylinder, cone, toroid, sphere) and instead derived from another calculation such as an extrusion-axis calculation.

The present invention may also derive a normalized error statistic from other fitting-algorithms resulting in reference planes, reference points, and reference vectors (such as revolving-axis and the extrusion-axis algorithms that result in reference vectors) and use it in place of the Average of error distribution.

Figure 4:
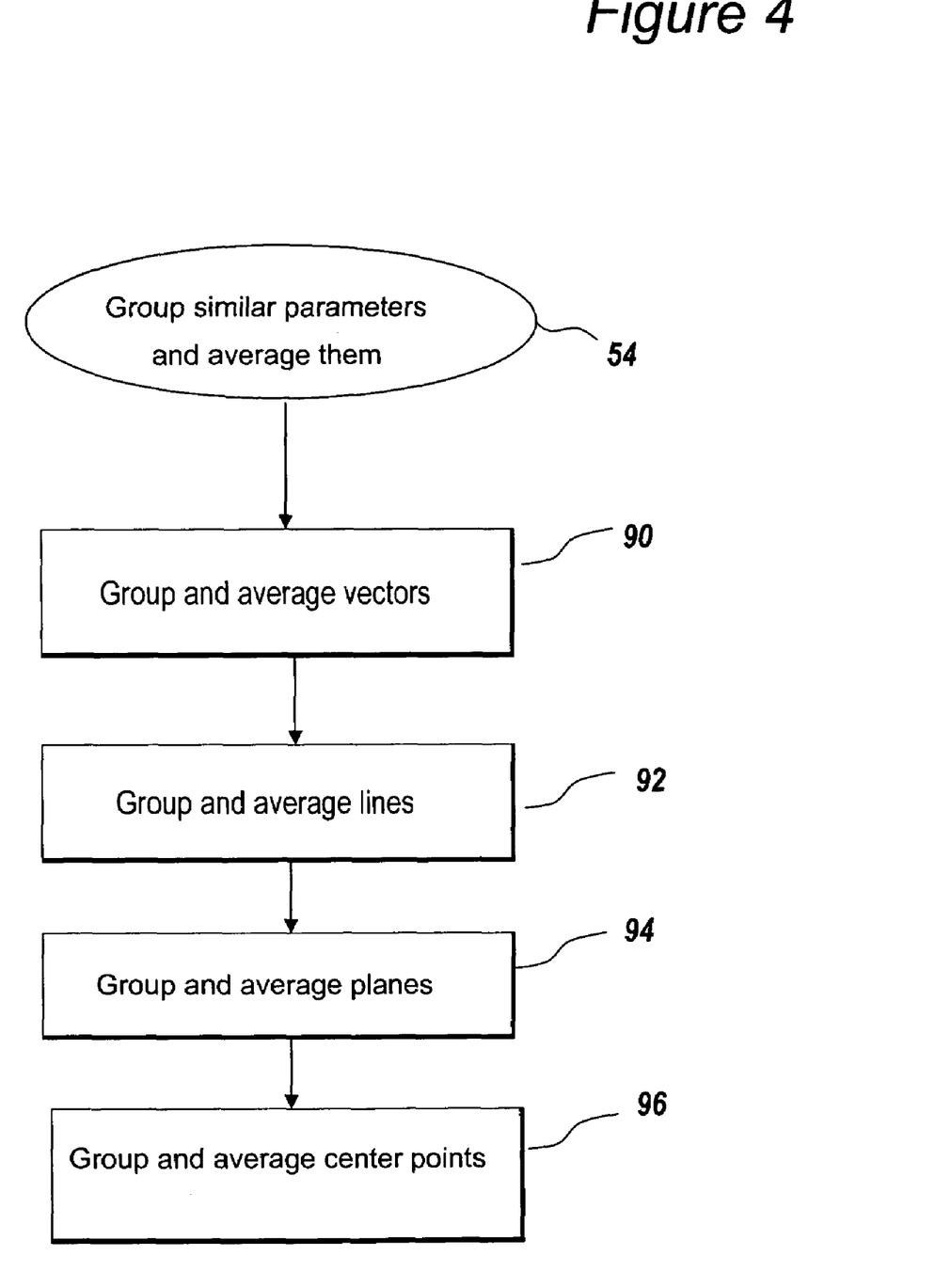
FIG. 4 is a flowchart depicting a sequence of steps followed by the illustrative embodiment of the present invention to group and average similar parameters.

After the classification of regions and the calculations of basic parameters for coordinate systems for the regions, the coordinated determination facility 8 groups similar parameters and averages them. FIG. 4 discusses the grouping and averaging of the parameters. The coordinate determination facility 8 groups and averages vectors (normals of planes or direction vectors of lines) when they are parallel to each other within a previously specified tolerance range (step 90). The coordinate determination facility 8 also groups and averages lines when they are co-linear to each other within a tolerance range (step 92). Additionally, the coordinate determination facility 8 groups and averages planes when they are co-planar to each other within a tolerance range (step 94) and groups and averages center points when they are coincident within a tolerance range (step 96).

When averaging similar parameters, the area of mesh region from which a parameter is extracted is used as a weighting factor. The average may be expressed as:

$$\text{Parameter Average} = \frac{\text{Sum}\left(\begin{array}{c} \text{Area } X \text{ Average of} \\ \text{error distribution}^{\wedge}-1 \text{ } X \text{ Parameter}\end{array}\right)}{\text{Sum}(\text{Area } X \text{ Average of error distribution}^{\wedge}-1)}$$

The term "Parameter Average" refers to one of a group's average parameter. For example, for the mesh model discussed in FIGS. 5A-8, for a parameter vector direction, it is noted that all of the calculated vectors are parallel within 1.5 degrees. Therefore if the tolerance range in the coordinate determination facility 8 allowed this deviation (i.e.: tolerance was set to 2 degrees) then all the vectors would be associated with the same group (4 vectors from cylinder-best-fit, 4 vectors from revolving-axis, and 5 vectors from extrusion-axis) and would be averaged together following the equation above. The average error distribution of the cylinder-best fit algorithm and the normalized error statistics from the revolving-axis and extrusion-axis algorithms are used in the "Average of error distribution" in the weighted "Parameter Average" equation shown above. Therefore, following the equation above, the "Parameter Average" (such as a vector direction) is the weighted average of all the group's region's vector's directions. The same averaging technique may also be used by the present invention for planes, lines and center points.

Figure 5A:
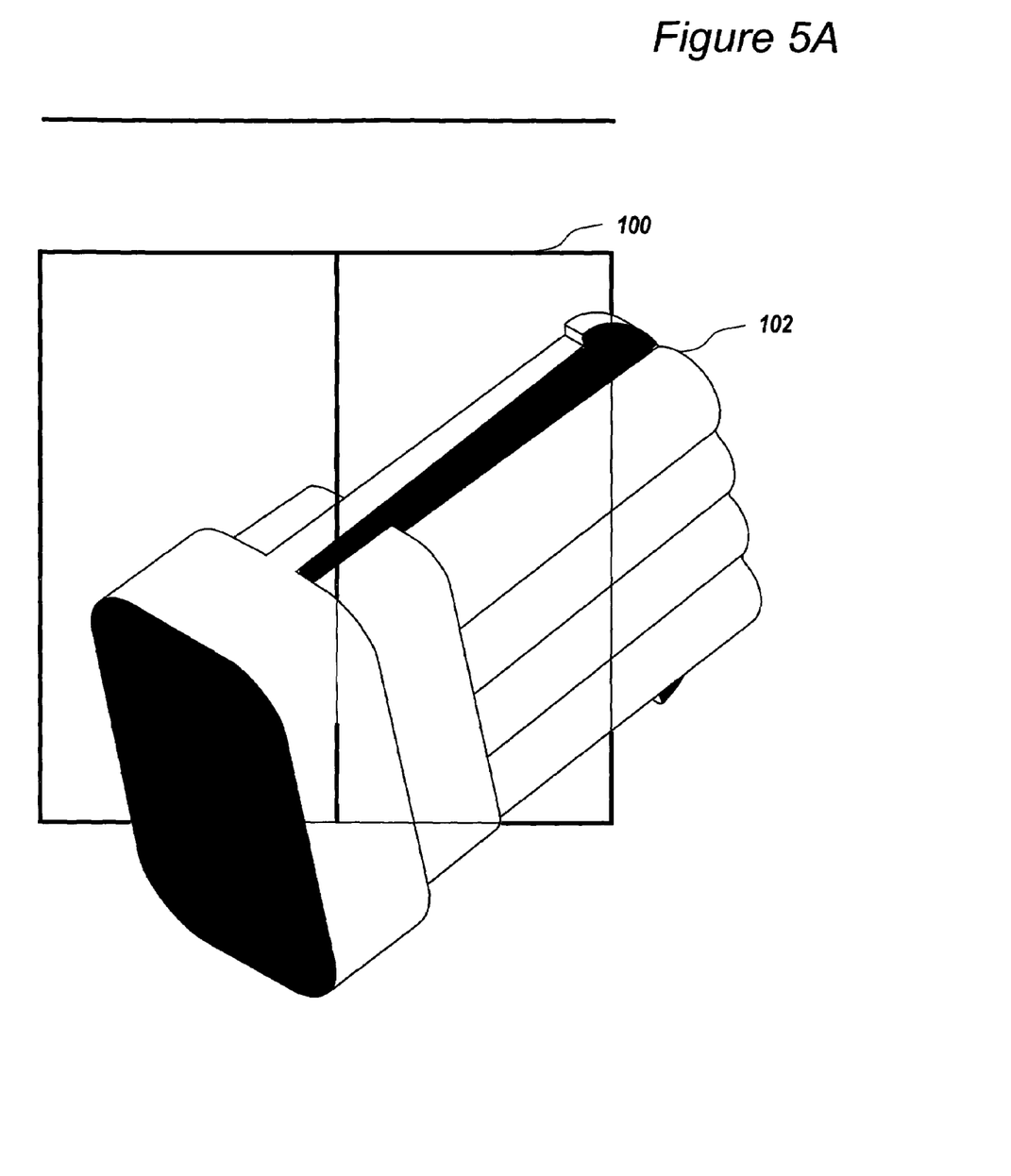
FIG. 5A depicts a view of an imported mesh that is not aligned to a global coordinate system.
Figure 5B:
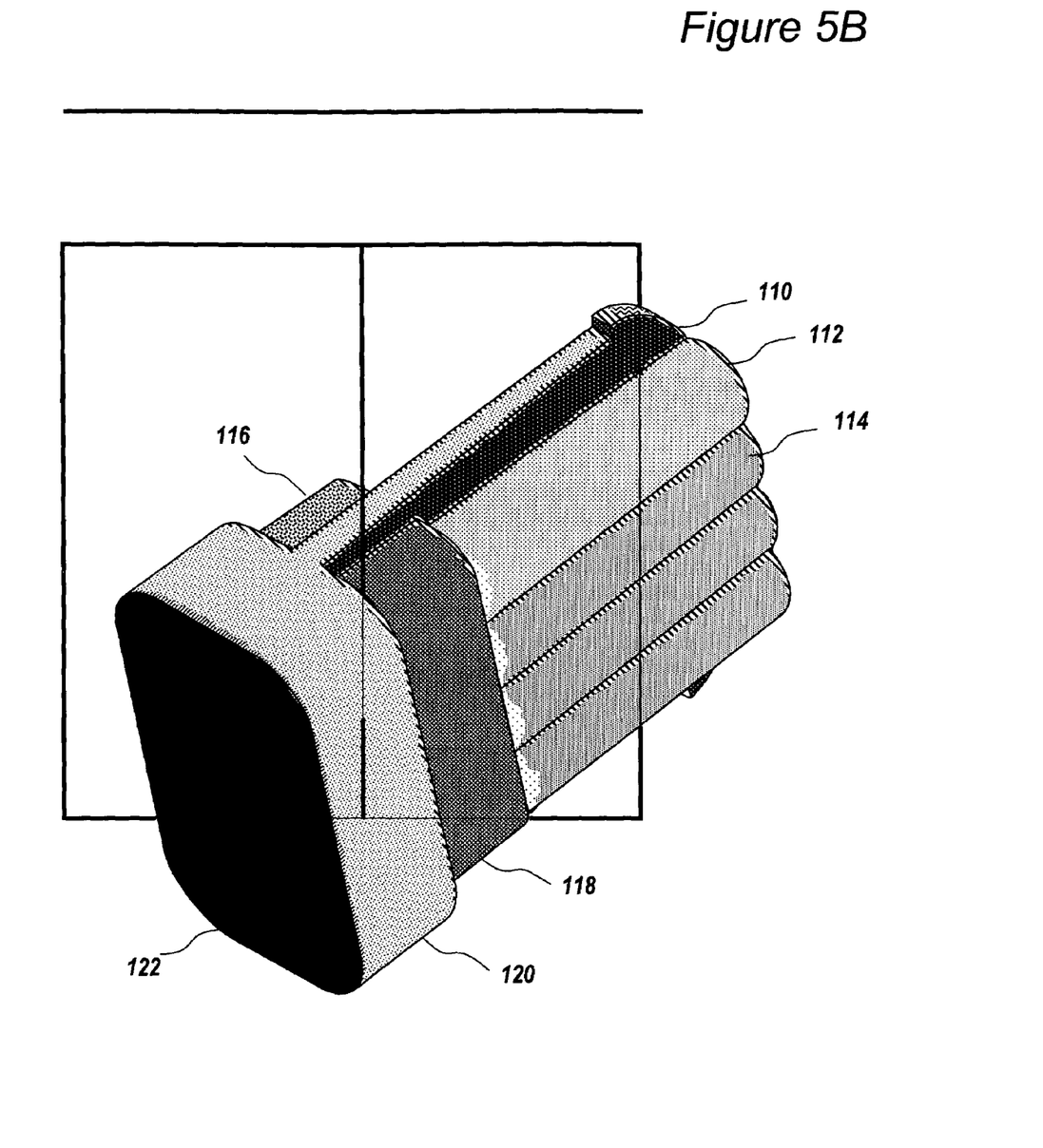
FIG. 5B depicts a view of the mesh of FIG. 5A after it is segmented into functional regions.
Figure 6A:
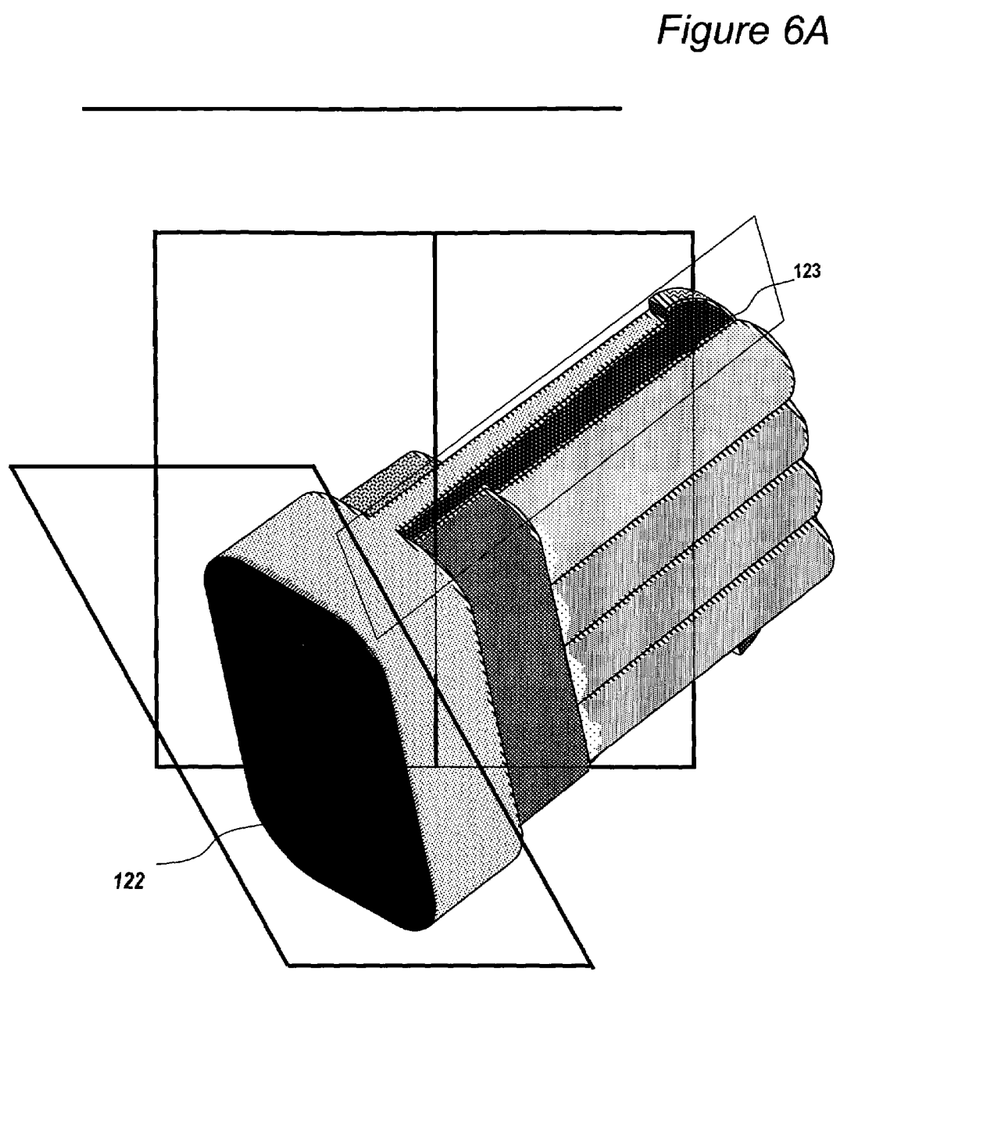
FIGS. 6A-6F depict views showing the calculation of basic parameters for coordinate systems for the regions.
Figure 6B:
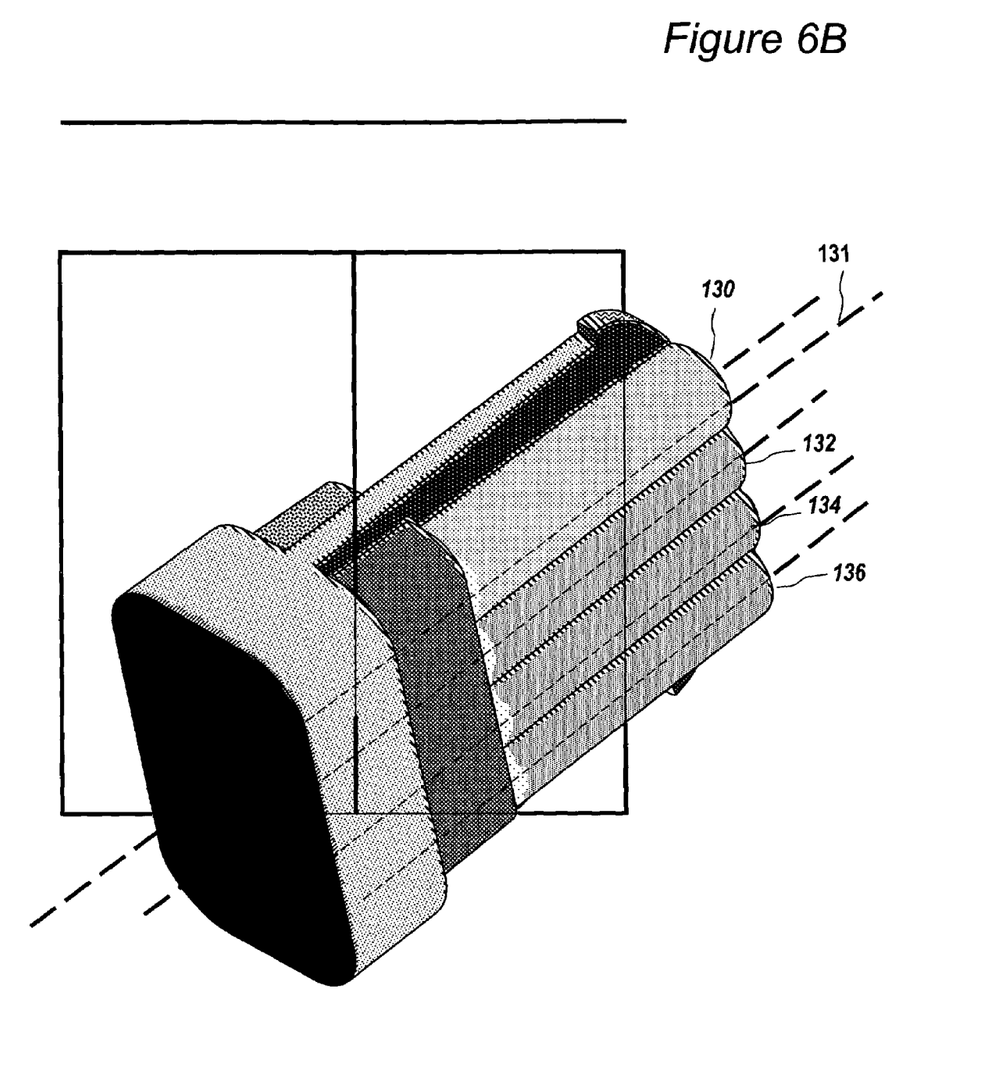
Figure 6C:
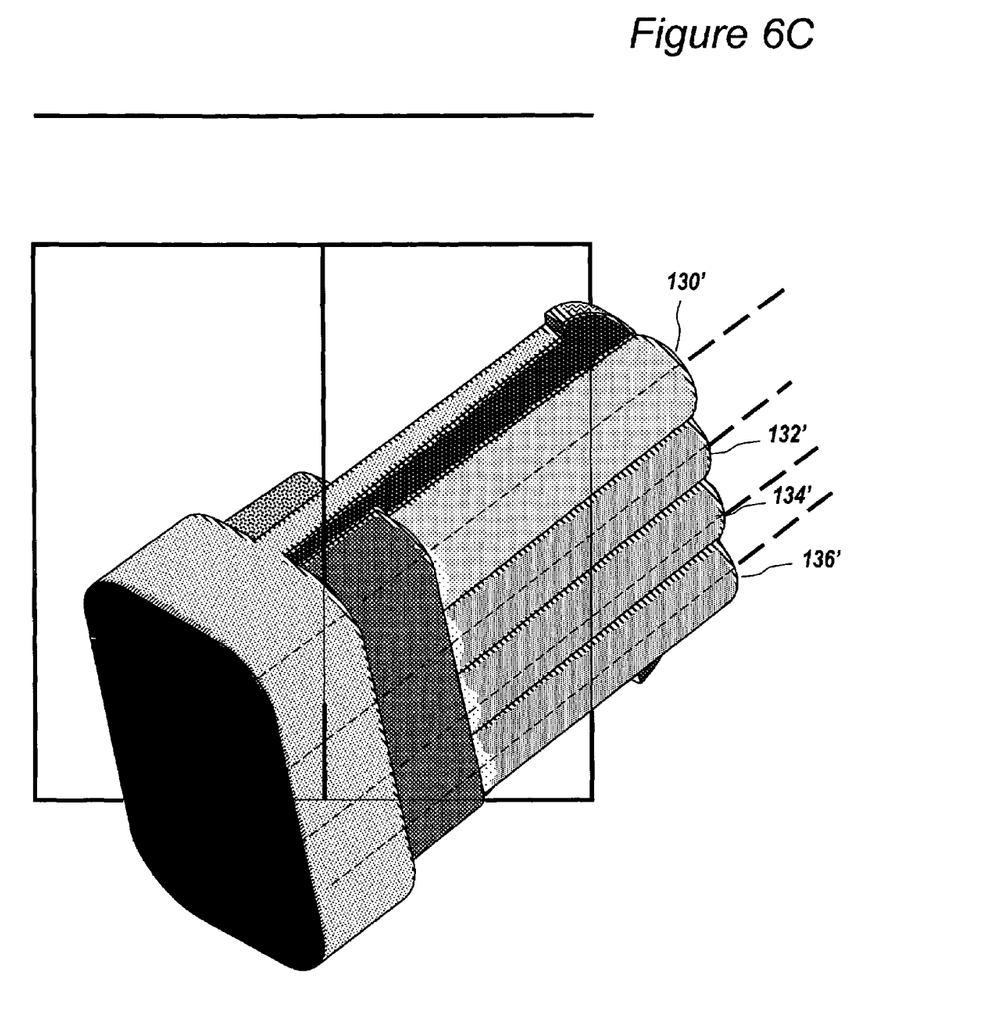
Figure 6D:
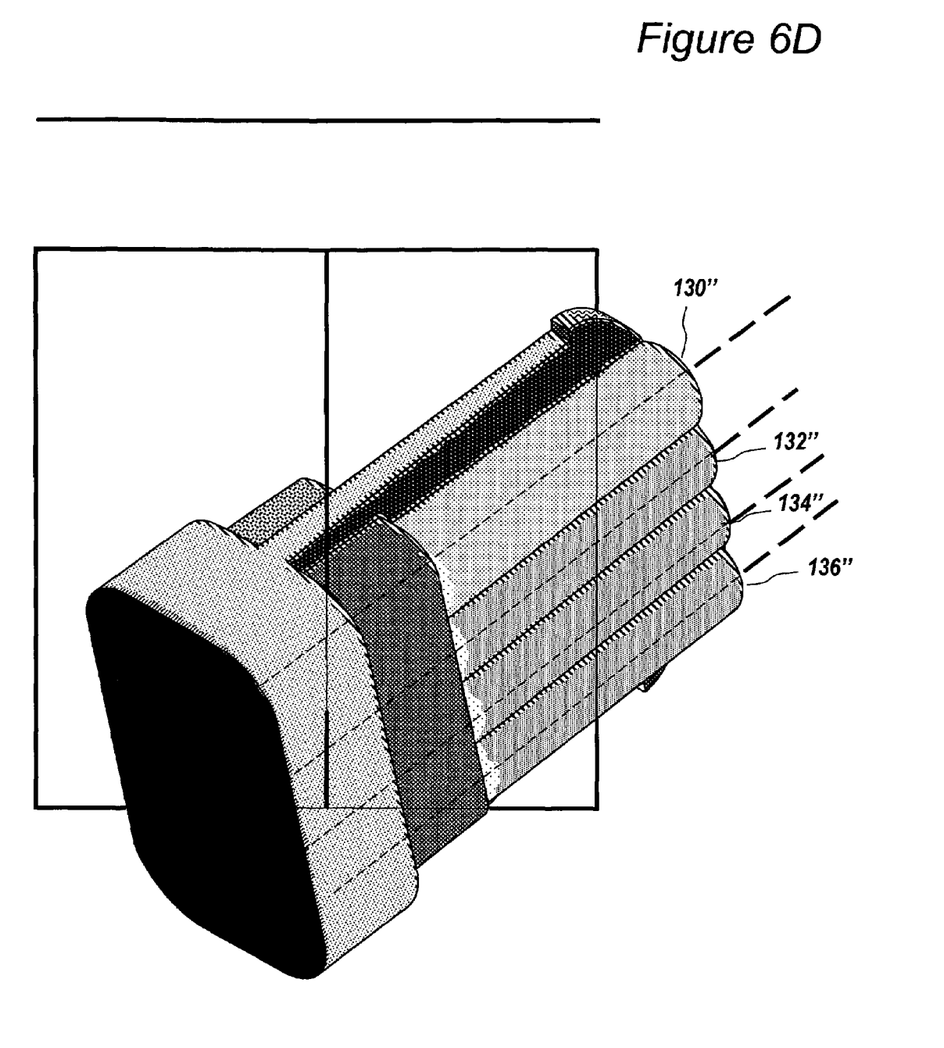
Figure 6E:
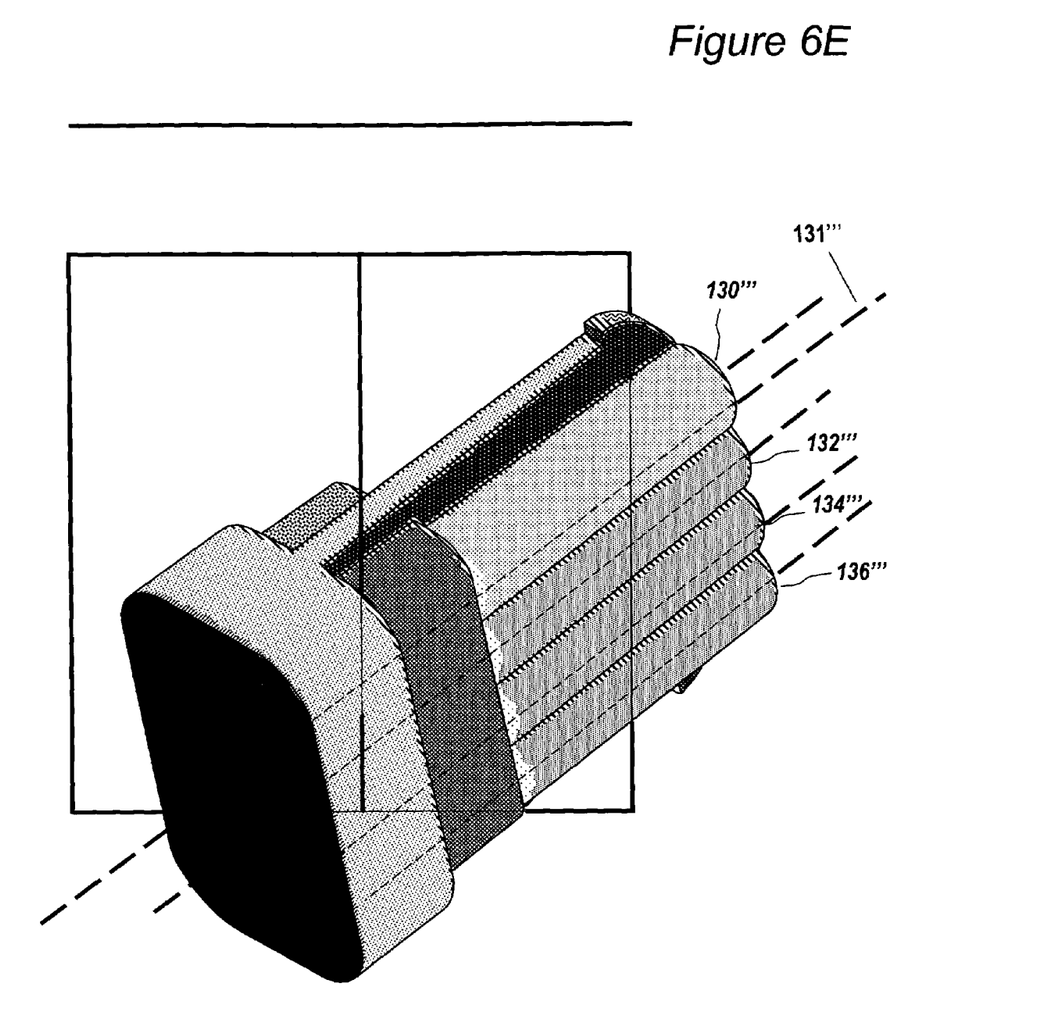
Figure 6F:
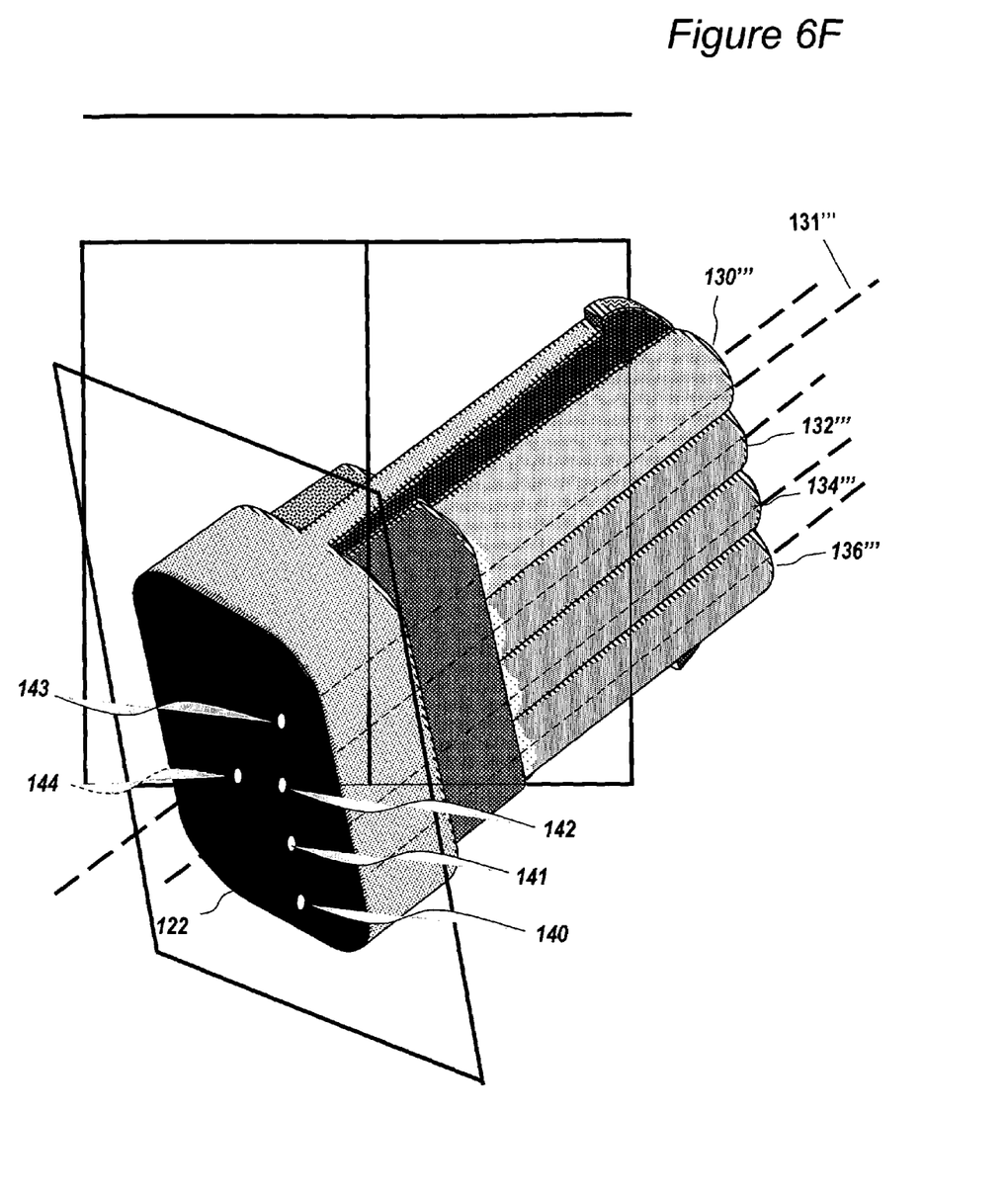

The illustrative embodiment of the present invention is further explained with reference to FIGS. 5A-8. FIG. 5A depicts a view of an imported mesh 102 that is not aligned to a global coordinate system 100. FIG. 5B depicts a view of the mesh of FIG. 5A after it is segmented into functional regions 112, 114, 116, 118, 120 and 122. The calculation of parameters for the classified regions may be seen by referring to FIGS. 6A-6D. FIGS. 6A-6D depict views showing the calculation of basic parameters for coordinate systems for the regions. The alignment algorithm used by the coordinate determination facility 8 begins by extracting reference geometries from the functional regions in the mesh model. FIG. 6A shows the application of a fit-plane algorithm to the bottom planar region 122 and the darker colored region 123. The fit-plane algorithm produces a best fit plane to the regions. These two planes are orthogonal to each other within an acceptable tolerance and therefore imply a third orthogonal direction FIG. 6B shows an extrusion axis algorithm that results in a reference vector that is applied to all regions individually 130, 132, 134, and 136 and in combination 131, however only the calculated extrusion axis vectors which are parallel within an acceptable tolerance are shown 130, 131, 132, 134, and 136. FIG. 6C shows a revolving axis algorithm that results in a reference vector is applied to the four nearly-cylindrical objects resulting in reference vectors 130', 132', 134' and 136'. FIG. 6D shows a best-fit cylinder-axis algorithm that results in a reference vector is also applied to the four nearly cylindrical objects resulting in reference vectors 130", 132", 134" and 136". Because the groups of vectors in FIGS. 6B-6C are parallel and collinear within tolerance they will be averaged as outlined previously into a set of averaged vectors. FIG. 6E shows the averaged vectors 130''', 131''', 132''', 134''' and 136'''. Each of these averaged vectors can be projected onto the parallel plane 122 to create an implied point. FIG. 6F shows the implied points 140, 141, 142, 143 and 144. With the entities from FIGS. 6A and 6E and the implied points there is more than enough information to create a coordinate and create multiple coordinates from the planes, vectors and implied points.

Figure 7:
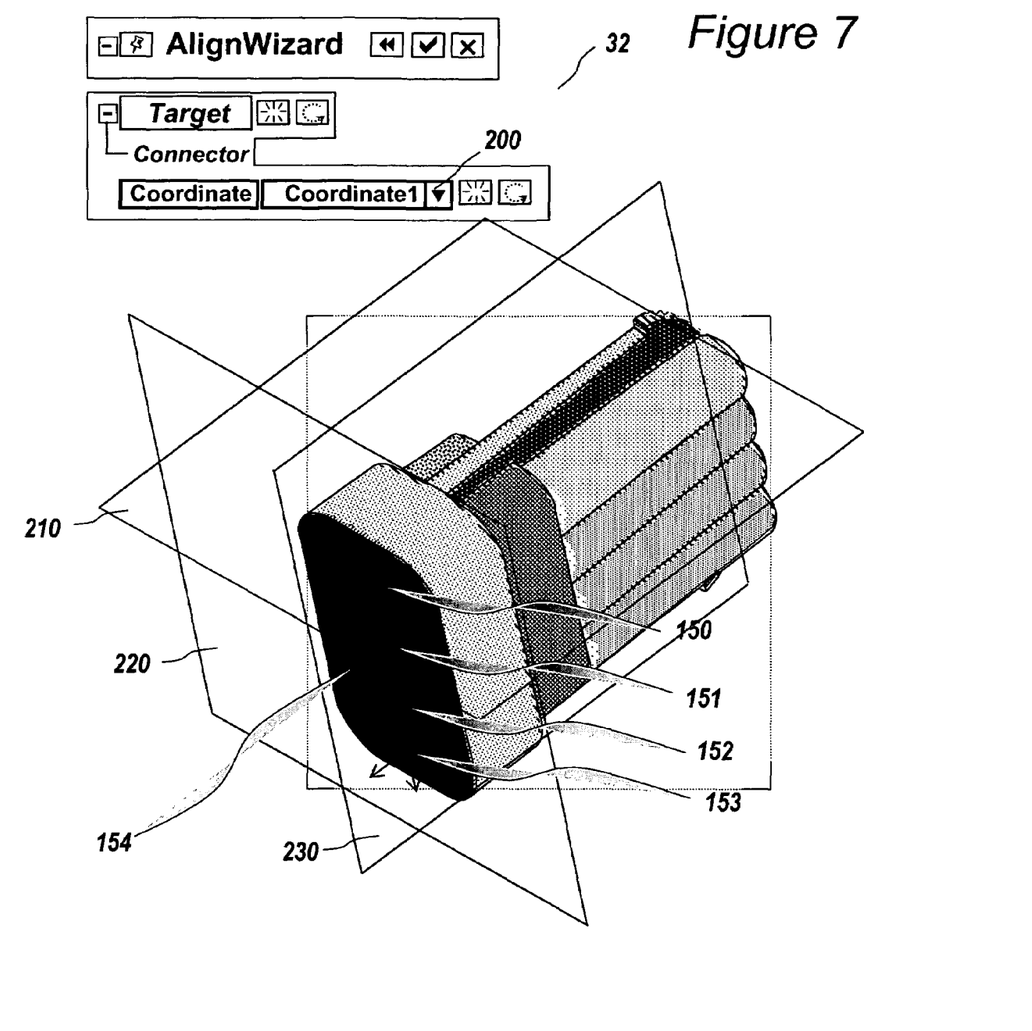
FIG. 7 depicts the graphical user interface generated by the illustrative embodiment of the present invention that lists the determined coordinate systems and enables the user selection of a coordinate system.
Figure 8:
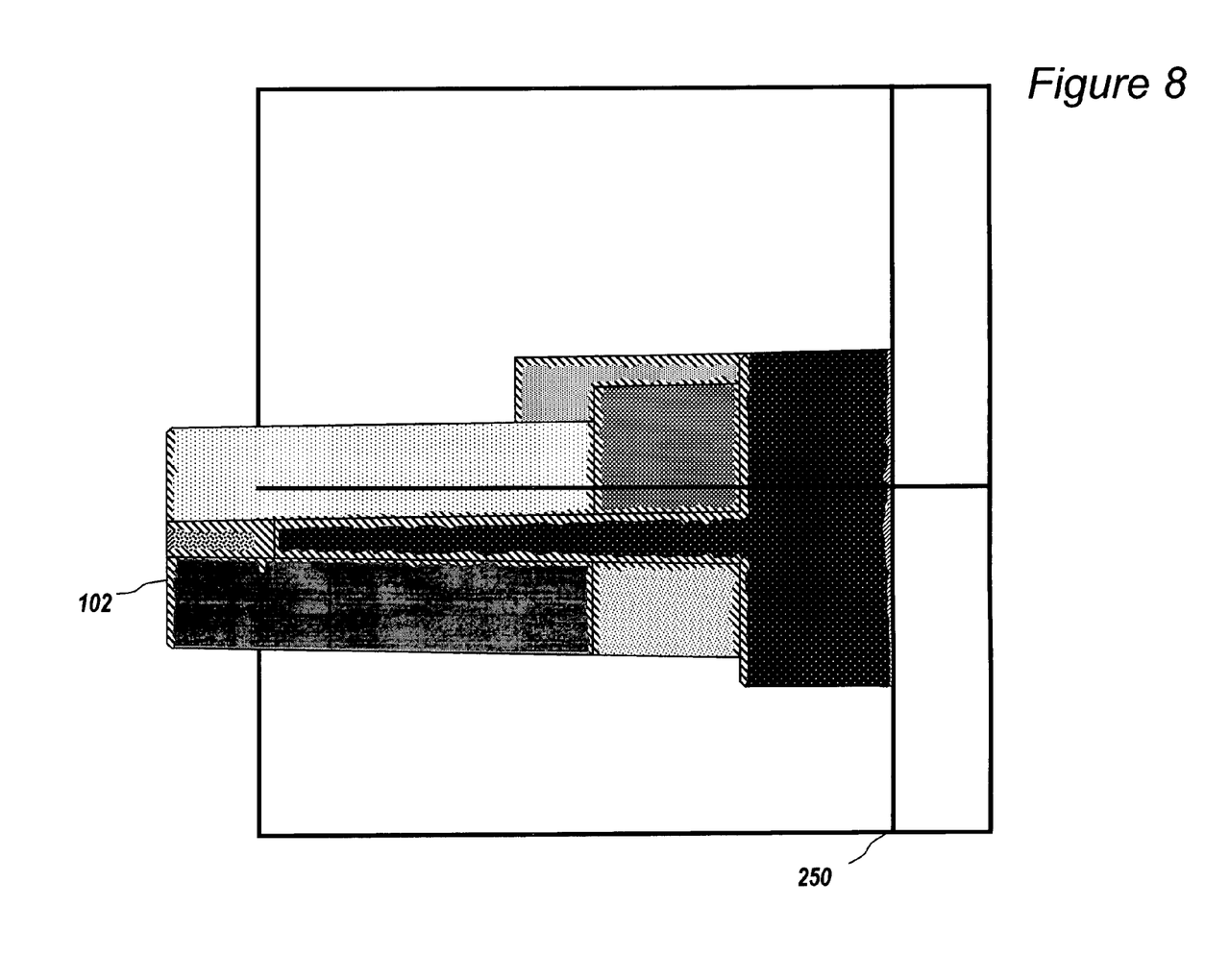
FIG. 8 show a generated view of the mesh model following the transformation of the mesh using the selected coordinate system.

FIG. 7 depicts the graphical user interface 32 generated by the illustrative embodiment of the present invention that lists the determined coordinate systems in ranked order 200 and enables the user selection of a coordinate system. The user is given three orthogonal directions by virtue of the two orthogonal directions and implied third orthogonal direction and is presented with five coordinate choices 150, 151, 152, 153 and 154 for the center point of the coordinate based on the five implied points 140, 141, 142, 143 and 144 from the pertinent averaged, calculated and best-fit entities. Once the user has selected a suggested coordinate (i.e.: 150) the user is also able to further modify the X, Y, and Z directions by choosing which plane 210, 220 and 230 will be X, Y, and Z (or front, top and right) when the coordinate system is aligned to the origin, and to choose the origin point. If the user chooses to modify the base one of the planes by choosing a different plane as a base surface, the present invention automatically adjusts the coordinate system. Once the user has selected one of the determined coordinate systems, the mesh model is aligned to the selected coordinate system 250 as depicted in FIG. 8.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for automatically determining coordinate systems for 3D scan data, comprising:

providing a collection of 3D scan data to a computing device, the 3D scan data used to generate a mesh model representing the surface of a three dimensional object;

determining programmatically with the computing device a plurality of coordinate systems for the 3D scan data;

generating with the computing device a ranked list of the plurality of determined coordinate systems;

segmenting the mesh model with the computing device;

classifying a plurality of regions in the segmented mesh model with the computing device;

calculating parameters with the computing device, the parameters used for defining coordinate systems for at least one of the classified regions;

identifying with the computing device at least one group of parameters from which a coordinate system is well-determined;

identifying with the computing device at least one group of parameters from which a coordinate system is undetermined by one degree of freedom; and sorting into the ranked list the identified at least one group of parameters from which a coordinate system is well-determined and the identified at least one group of parameters from which a coordinate system is undetermined by one degree of freedom, the sorting occurring using the computing device.

2. The method of claim 1, further comprising:

transforming with the computing device the alignment of the mesh model based on one of the plurality of determined coordinate systems.

3. The method of claim 1, further comprising:

presenting with the computing device the ranked list to a user via a graphical user interface, the graphical user interface enabling the selection of a coordinate system in the ranked list by the user;

receiving a selection with the computing device, based on a user indication, of a coordinate system in the ranked list via the graphical user interface; and transforming with the computing device the alignment of the mesh model based on the selected coordinate system.

4. The method of claim 3 wherein the user customizes the selected coordinate system prior to transforming the alignment of the mesh model.

5. The method of claim 4 wherein the user modifies one of the X, Y and Z planes when the coordinate system is aligned to the origin.

6. The method of claim 4 wherein the user alters the origin point.

7. The method of claim 1 wherein the classified region is one of a planar region, cylindrical region, conic region, toroidal region, spherical region and freeform region.

8. The method of claim 1 wherein the calculation of parameters includes at least one of the calculation of a normal vector, direction vector, revolving line, point and center point.

9. The method of claim 1 wherein the determining further comprises:
grouping with the computing device a plurality of the calculated parameters; and averaging the grouped parameters using the computing device.

10. A physical medium for use with a computing device, the physical medium holding computer-executable instructions for automatically determining coordinate systems for 3D scan data, the instructions when executed causing a computing device to:
provide a collection of 3D scan data, the 3D scan data used to generate a mesh model representing the surface of a three dimensional object;
determine programmatically a plurality of coordinate systems for the 3D scan data; and
generate a ranked list of the plurality of determined coordinate systems;
segment the mesh model;
classify a plurality of regions in the segmented mesh model;
calculate parameters used for defining coordinate systems for at least one of the classified regions;
identify at least one group of parameters from which a coordinate system is well-determined;
identify at least one group of parameters from which a coordinate system is undetermined by one degree of freedom; and
sort into the ranked list the identified at least one group of parameters from which a coordinate system is well-determined and the identified at least one group of parameters from which a coordinate system is undetermined by one degree of freedom.

11. The medium of claim 10, wherein the execution of the instructions further causes the computing device to:
transform the alignment of the mesh model based on one of the plurality of determined coordinate systems.

12. The medium of claim 10, wherein the execution of the instructions further cause the computing device to:
present the ranked list to a user via a graphical user interface, the graphical user interface enabling the selection of a coordinate system in the ranked list by the user;
select, based on a user indication, a coordinate system in the ranked list via the graphical user interface; and
transform the alignment of the mesh model based on the selected coordinate system.

13. The medium of claim 12 wherein the user customizes the selected coordinate system prior to transforming the alignment of the mesh model.

14. The medium of claim 10 wherein the execution of the instructions to determine of a plurality of coordinate systems for the 3D scan data further causes the computing device to:
group a plurality of the calculated parameters; and
average the grouped parameters.

* * * * *